United States Patent [19]

Creps et al.

[11] Patent Number: 4,656,829

[45] Date of Patent: Apr. 14, 1987

[54] SYSTEM FOR PREDICTING CATALYTIC CONVERTER TEMPERATURE

[75] Inventors: Wendell D. Creps, Lake Orion; William B. Orrell, Sterling Heights, both of Mich.

[73] Assignee: General Motors Corporation, Detroit, Mich.

[21] Appl. No.: 822,784

[22] Filed: Jan. 27, 1986

[51] Int. Cl.$^4$ .............................................. F01N 3/20
[52] U.S. Cl. ........................................ 60/277; 60/276
[58] Field of Search .......................... 60/274, 276, 277

[56] References Cited

U.S. PATENT DOCUMENTS

| 4,209,981 | 7/1980 | Miyamori et al. | 60/277 |
| 4,319,451 | 3/1982 | Tajima et al. | 60/277 |
| 4,542,728 | 9/1985 | Otobe et al. | 60/277 |

Primary Examiner—Douglas Hart
Attorney, Agent, or Firm—Howard N. Conkey

[57] ABSTRACT

A system and method of predicting the temperature of the bed of a catalytic converter positioned in the exhaust system of an internal combustion engine.

3 Claims, 4 Drawing Figures

SYSTEM FOR PREDICTING CATALYTIC CONVERTER TEMPERATURE

This invention relates to a system of protection for a catalytic converter and particularly toward a system for predicting the temperature of a catalytic converter and providing an indication when the temperature exceeds a predetermined maximum value.

In order to minimize the amounts of carbon monoxide, hydrocarbons and nitrogen oxides discharged from an internal combustion engine, it is common to utilize a catalytic converter that can simultaneously accomplish both the oxidation and reduction necessary for minimizing those exhaust gas components. When the air/fuel ratio of the mixture supplied to the internal combustion engine is maintained within a narrow band near the stoichiometric ratio, the converter is effective to oxidize carbon monoxides and hydrocarbons and is effective to reduce nitrogen oxides.

While it is necessary for a catalytic converter to operate at elevated temperatures it is undesirable to operate at excessive temperatures since thermal deterioration is a significant contributor to the loss of monolithic three-way catalyst activity. This deterioration results in a decline in the conversion efficiency of the converter thereby reducing its effectiveness thereafter to achieve the desired performance. In order to prevent this deterioration in catalytic converter activity, it is necessary to take corrective action when the temperature of the catalytic converter approaches an undesirable level that may result in its deterioration and therefore its performance.

Typically, the catalytic converter temperature is determined by measurement such as by a temperature sensing element in the bed of the converter. When the sensor indicates the converter bed temperature approaching an excessive level, the engine operation is altered so as to prevent a further increase in temperature. As noted, this form of catalytic converter protection system requires the use of a temperature sensing element mounted in the catalytic converter.

It would be desirable to eliminate the requirement of a temperature sensor carried in the bed of a catalytic converter to enable protection of the converter from over-temperature conditions. In accord with this invention, the actual catalytic converter temperature is predicted based on engine operating parameters as opposed to the use of a measuring element as in the aforementioned prior systems.

The invention may be best understood by reference to the following description of a preferred embodiment and the drawings in which.

In general, the temperature of a catalytic converter in the exhaust stream of an internal combustion engine is predicted using empirically determined steady state temperature contributions to the catalytic converter from the mass air flow through the engine and the air/fuel ratio of the mixture supplied to the engine. These steady state values are applied to a first order lag filter equation having a time constant that is based on mass air flow through the engine and which defines the response of the catalytic converter temperature to transient operation of the engine.

The expression utilized to predict the temperature of the catalytic converter in accord with the foregoing is as follows:

$$ECT_N = ECT_{N-1} + COEF[f(ARFL)]\{EEGT[f(ARFL)] + ECEXT[f(AF)] - ECT_{N-1}\}$$

where ARFL is the engine air flow, AF is the engine air/fuel ratio, $ECT_N$ is the predicted converter temperature, EEGT is the estimated exhaust gas temperature at the stoichiometric ratio, ECEXT is the estimated contribution to converter temperature due to exothermic reactions and COEF is the first order difference equation coefficient relating the time constant of the converter temperature change as a function of air flow.

The schedules of values of COEF, EEGT and ECEXT as a function of the engine air flow and air/fuel ratio are determined experimentally and the experimentally determined schedules are implemented in the catalytic converter temperature prediction system of this invention.

Figure 1:
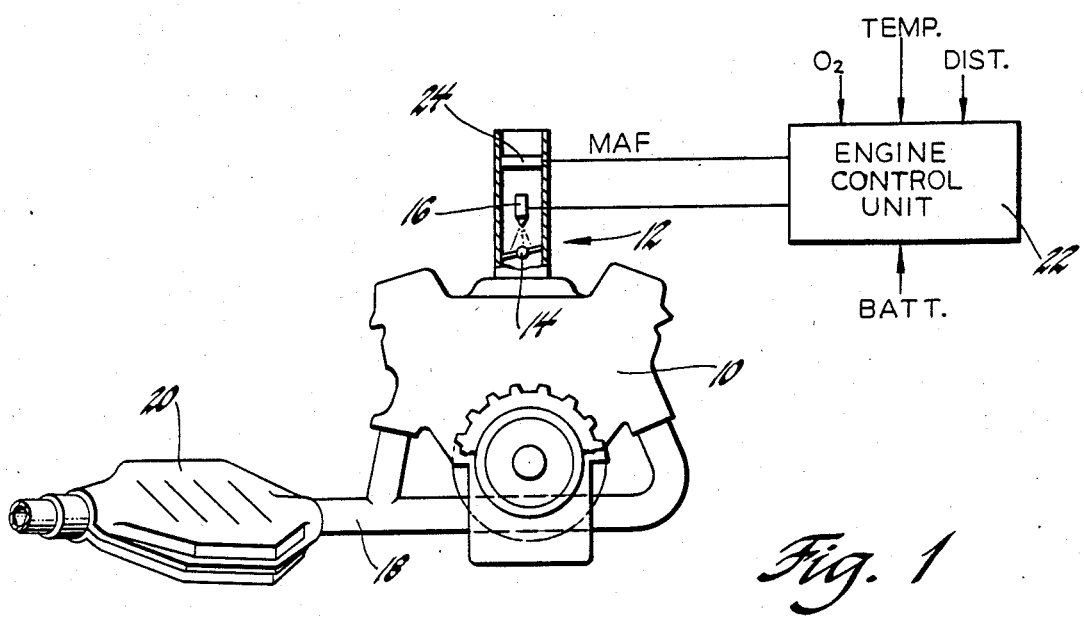
FIG. 1 illustrates an internal combustion engine having a catalytic converter and an engine control unit that incorporates the converter over-temperature detection system of this invention.

Referring to FIG. 1, there is illustrated an internal combustion engine 10 that is supplied with an air and fuel mixture through an intake system 12. The intake system 12 includes a throttle blade 14 manually positioned to regulate mass air flow into the engine 10. Fuel is provided at a location above the throttle blade 14 via a fuel injector 16. The air and fuel mixture drawn into the engine 10 undergoes combustion and the exhaust gases resulting therefrom are discharged into an exhaust conduit 18 and to the atmosphere via a catalytic converter 20. The catalytic converter 20 takes the form of a conventional three-way catalytic converter that is effective to simultaneously convert hydrocarbons, nitrogen oxides and carbon monoxide when the air/fuel ratio of the mixture supplied to the engine 10 is substantially at the stoichiometric value.

The fuel injector 16 is controlled so as to establish a desired air/fuel ratio by an engine control unit 22. Inputs to the engine control unit 22 include the output of a conventional mass air flow sensor 24 providing a signal representing the mass air flow into the engine 10, the output of a conventional oxygen sensor (not shown) monitoring the oxidizing/reducing state of the exhaust gases discharged from the engine 10 and the output of a conventional temperature sensor (not shown) monitoring engine temperature. Additionally, the engine control unit receives a pulse input with each engine cylinder intake event from a conventional engine ignition system distributor (not shown) having a frequency proportional to engine speed. Operating power for the engine control unit 22 is provided by a conventional vehicle battery.

As will be described, the engine control unit 22 predicts the temperature of the catalytic converter 20 and is effective to adjust the fuel supplied by the injector 16 so as to prevent the converter 20 from exceeding a predetermined temperature level above which permanent loss of catalytic activity may result.

Figure 2:
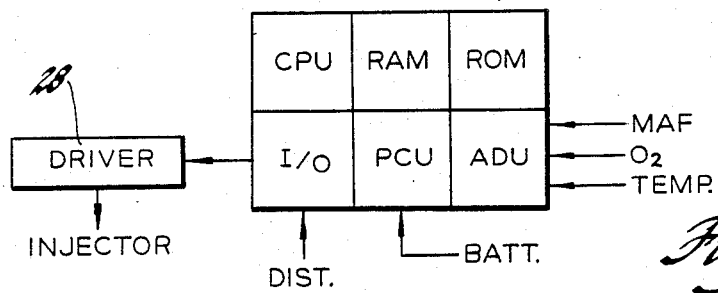
FIG. 2 illustrates a digital embodiment of engine control unit of FIG. 2.

The engine control unit 22 takes the form of a digital computer generally illustrated in FIG. 2. The digital computer is standard in form and includes a central processing unit (CPU) which executes an operating program permanently stored in a read-only memory (ROM) which also stores tables and constants utilized in predicting the temperature of the catalytic converter 20 and providing an over-temperature indication. Contained within the CPU are conventional counters, registers, accumulators, flag flip flops, etc. along with a clock which provides a high frequency clock signal.

The engine control unit 22 also includes a random access memory (RAM) into which data may be temporarily stored and from which data may be read at various address locations determined in accord with the program stored in the ROM. A power control unit (PCU) receives battery voltage which may be provided through the vehicle ignition switch and provides regulated power to the various operating circuits in the engine control unit 22. The engine control unit 22 further includes an input/output circuit (I/0) that includes an output counter section for controlling the duration of energization of the fuel injector 16. The output counter section is controlled by the CPU to provide the timed injection pulses to a driver circuit 28 for energizing the injector 16.

The I/0 also includes an input counter section which receives the pulse output from the vehicle distributor which generates a pulse for each cylinder during each engine cycle. These distributor pulses are used for determining engine speed and for initiating the energization of the fuel injector winding 16. Engine speed may be determined by counting clock pulses from the internal clock between distributor pulses.

An analog-to-digital unit (ADU) in the engine control unit provides for the measurement of analog signals. The various analog signals representing conditions upon which the injection pulse widths are based and for predicting the temperature of the catalytic converter 20 are supplied to the analog inputs of the ADU. In the present embodiment, these signals include the mass air flow signal from the mass air flow sensor 24, the signal representing the temperature of the engine 10 and the output of the oxygen sensor. These signals are each sampled and converted under control of the CPU and the values stored in ROM designated RAM memory locations.

In general, the engine control unit 22 controls the fuel flow into the engine via control of the fuel injector 16 in response to various engine operating parameters including mass air flow into the engine, engine temperature and the oxidizing/reducing condition of the exhaust gases discharged from the engine 10 so as to achieve a scheduled air/fuel ratio.

The engine control unit also continuously predicts the temperature of the catalytic converter 20 based on the engine operating parameters including mass air flow through the engine and the scheduled air/fuel ratio. Based on this prediction, the engine control unit 22 detects when the catalytic converter has reached a temperature above which degradation of or damage to the converter may occur. The engine control unit 22 may then respond to the detection of this maximum temperature to adjust the air-fuel mixture conditions so as to maintain the predicted temperature of the catalytic converter 20 at or below the maximum allowable temperature.

Figure 3:
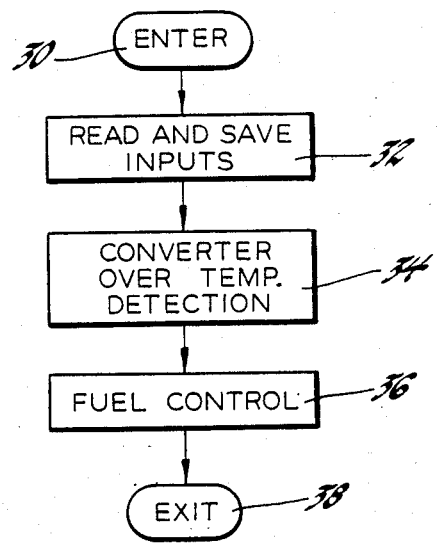
FIGS. 3 and 4 are diagrams illustrative of the operation of the digital engine control unit of FIG. 2 in carrying out the principles of this invention.

Referring to FIG. 3, a general program routine executed by the engine control unit 22 is illustrated. This routine is initiated by the CPU at constant time intervals such as 10 milliseconds. The routine is entered at step 30 and proceeds to step 32 where the various engine operating parameters are read and stored. At this step, the program executes the analog-to-digital conversion of the mass air flow signal, the engine temperature signal and the output of the oxygen sensor. The resulting digital numbers are then saved in ROM designated RAM locations.

From step 32, the program proceeds to a step 34 where the program executes a converter over-temperature detection routine embodying the principles of this invention. Thereafter, the program proceeds to a fuel control routine 36. The fuel control routine 36 is conventional and responds to the values of mass air flow, engine temperature and the oxidizing reducing condition of the exhaust gases stored at step 32 to control the injector 16 to achieve a desired air/fuel ratio. Typically, when the engine is warm this air/fuel ratio is the stoichiometric ratio. However, at other engine operating conditions such as during engine warm-up or high load conditions, the air/fuel ratio may be controlled to ratios other than the stoichiometric ratio.

The fuel control routine 36 further responds to a converter over-temperature condition detected at step 34 to adjust the air-fuel mixture supplied to the engine 10 to maintain the temperature of the catalytic converter 20 below the over-temperature level. For example, when an over-temperature condition is detected, the scheduled air/fuel ratio may be decreased to provide a rich mixture that may be, in one embodiment, a function of the air flow into the engine. At these rich mixture conditions, the temperature of the exhaust gases discharged from the engine 10 and passing through the catalytic converter 20 are lower and also result in no exothermic reaction in the converter. This results in a lowering of the temperature of the catalytic converter 20 to maintain it in a safe temperature operating region.

Additional steps that may be taken at step 36 in order to protect the catalytic converter 20 include decreasing the deceleration enleanment magnitude to minimize lean transient excursions, delaying deceleration fuel cut-off to minimize exposure of the converter to excess oxygen and increasing closed throttle bypass air to ensure complete combustion in the cylinders of the engine 10.

The program then exits the routine of FIG. 3 at step 38. At the beginning of the next 10 millisecond interval, the steps 30 through 38 are again repeated.

Figure 4:
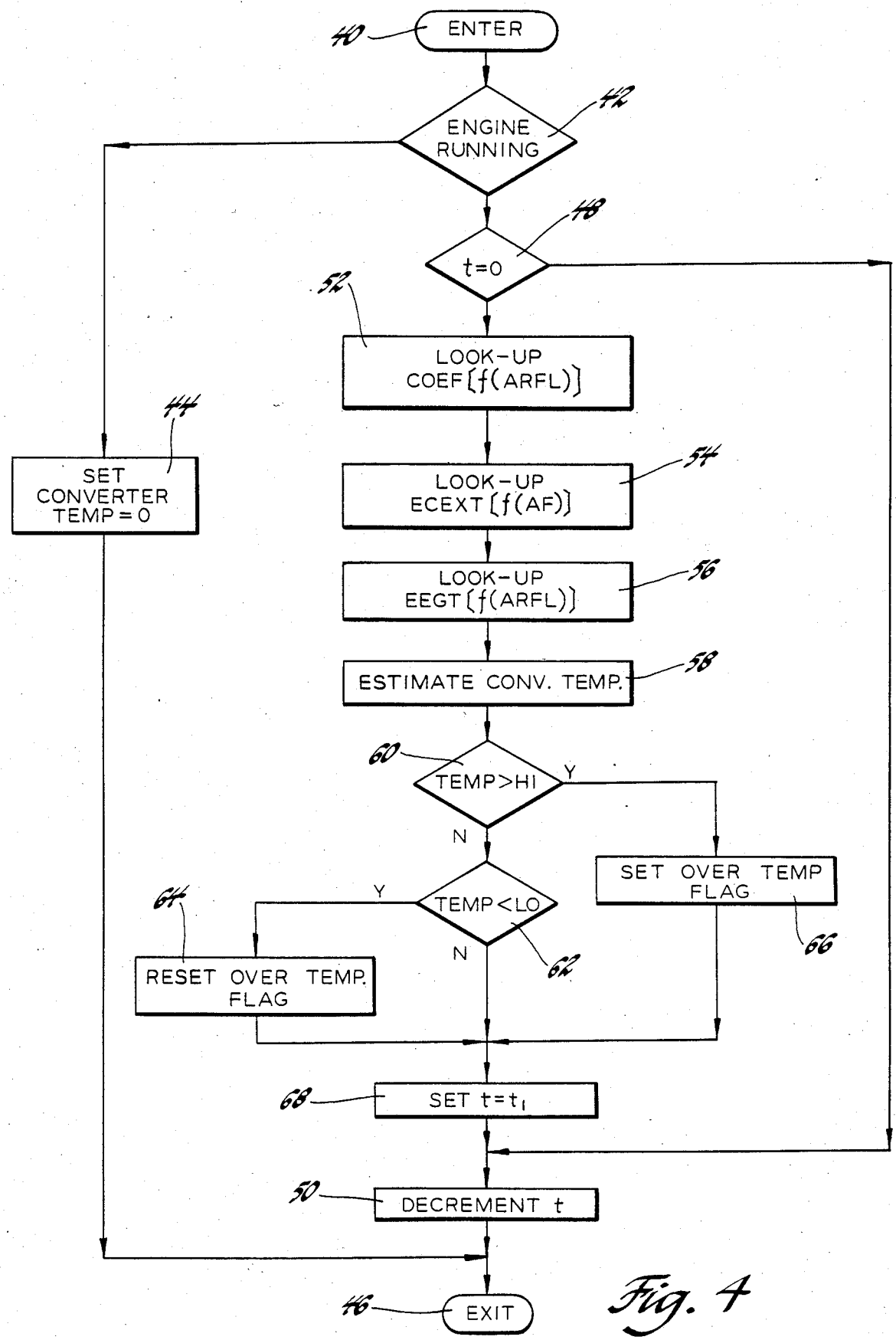

Referring to FIG. 4, the converter over-temperature detection routine 34 of FIG. 3 is illustrated. The routine is entered at step 40 and proceeds to a step 42 where it determines whether or not the engine 10 is running. This condition may be detected by the presence of distributor pulses sensed by the engine control unit and from which engine speed is determined and saved at step 32. If the engine is not running, the program proceeds to a step 44 where the predicted value of the temperature of the catalytic converter 20 is set to zero. Thereafter, the program exits the converter over-temperature detection routine at step 46.

Returning to step 42, if it is determined that the engine is running, the program proceeds to a step 48 where a time t stored in a timing register is compared to zero. If t is not zero, the program proceeds to a step 50 where the timing register is decremented. Thereafter, the program exits the routine at step 46. However, if at step 48 it is detected that the time t has been decremented to zero, the program executes a series of steps 52, 54, 56 and 58 to predict the temperature of the catalytic converter 20 in accord with the expression previously described.

At step 52, a look-up routine is executed to determine from a table of values stored in the ROM as a function of engine air flow the value of the first order difference equation coefficient COEF of the aforementioned expression that corresponds to the value of air flow read and saved at step 32 of FIG. 3. This coefficient relates the time constant of the converter temperature change as a function of air flow and is typically smaller for low engine air flow and larger at high air flow. A smaller filter coefficient provides a longer time constant and thus a slower change in the predicted converter temperature in response to transient engine operating conditions. The values of the coefficient COEF were initially determined empirically and stored in the ROM table.

At step 54, a look-up routine is executed to determine from a table of values stored in the ROM as a function of air/fuel ratio the value of ECEXT, representing the steady state contribution of the temperature of the catalytic converter 20 due to exothermic reactions, that corresponds to the air/fuel ratio of the mixture supplied to the engine 10 via the fuel control routine 36 of FIG. 3. The values of ECEXT were initially determined empirically and stored in the ROM table.

At step 56, a look-up routine is executed to determine from a table of values stored in the ROM as a function of engine air flow the value of EEGT, representing the steady state contribution of the temperature of the catalytic converter at the stoichiometric ratio, that corresponds to the engine air flow read and saved at step 32 of FIG. 3. The values of EEGT were initially determined empirically and stored in the ROM table.

The sum of the steady state temperature contributions established at steps 54 and 56 represents the steady state converter temperature based on the current engine operating condition. At step 58, the temperature of the catalytic converter is predicted by applying the values determined at steps 52, 54, and 56 to the above-described first order difference equation.

By use of the empirically determined values stored in the tables utilized in steps 52, 54 and 56 in the first order difference equation described, an accurate prediction of the temperature of the bed of the catalytic converter 20 is obtained.

From step 58, the program proceeds to a step 60 where the predicted temperature is compared with an upper temperature limit above which degradation in the performance of the catalytic converter 20 may result. If the temperature is less than the critical value, the program proceeds to a step 62 where the predicted temperature is compared with a lower temperature value, the difference between the high and low temperature values of steps 60 and 62 defining a hysteresis band in the indication of an over-temperature condition. If the predicted temperature is less than the low value, the program proceeds to a step 64 where an over-temperature flag is reset to indicate a safe operating condition of the catalytic converter 20. If at step 60 it is determined that the temperature is greater than the high value, the program proceeds to a step 66 where the over-temperature flag is set to indicate an over-temperature condition of the catalytic converter 20. From either step 62, 64 or 66, the program proceeds to a step 68 where the timing register establishing the interval over which the steps 52 through 66 are executed is set to $t_1$. In one embodiment, $t_1$ may be such that the predicted temperature of the catalytic converter 20 is updated at 200 millisecond intervals.

From step 68, the program proceeds to step 50 where the timing register is decremented after which the program exits the routine at step 46.

As previously indicated with respect to FIG. 3, the fuel control routine 36 responds to an over-temperature condition (represented by a set condition of the over-temperature flag) to control the air-fuel mixture input to the engine 10 so as to decrease the temperature of the catalytic converter 20 to below the over-temperature limit. As previously indicated, the control may embody enrichment of the air/fuel ratio, a decreasing of the deceleration enleanment magnitude, a delay in deceleration fuel cutoff to minimize the exposure of the hot catalytic converter to excess oxygen and an increase in the closed throttle bypass air to ensure complete combustion in the cylinders. When the temperature of the catalytic converter decreases below the threshold level of step 62 of FIG. 4, resulting in the over-temperature flag being reset at step 64, the fuel control routine 36 reverts to normal fuel control.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for predicting the temperature of an exhaust gas purifying device positioned in the exhaust system of an internal combustion engine into which air and fuel are drawn to undergo combustion and from which exhaust gases are discharged into the exhaust system, the system comprising:

means for storing (A) a first schedule of predetermined values of the steady state contribution to the exhaust gas purifying device temperature due to the temperature of the exhaust gases as a function of the air flow into the engine, (B) a second schedule of predetermined values of the steady state contribution to the exhaust gas purifying device temperature due to exothermic reactions as a function of the air/fuel ratio of the mixture drawn into the engine and (C) a third schedule of predetermined values of the time response of the temperature of the exhaust gas purifying device to changes in the air flow through the engine and the air/fuel ratio of the mixture drawn into the engine as a function of the air flow drawn into the engine;

means for measuring the air flow into the engine;

means for regulating the ratio of the air and fuel drawn into the engine; and means for providing a predicted temperature of the exhaust gas purifying device that is varied toward the sum of the predetermined values of the steady state contribution to the converter temperature in the first and second schedules corresponding to the measured air flow and the regulated ratio of the air and fuel, respectively, at a rate determined by the value of the time response in the third schedule corresponding to the measured air flow into the engine.

2. The system of claim 1 and which further comprises means for providing a signal when the predicted temperature of the exhaust gas purifying device exceeds a predetermined limit above which deterioration in the performance of the exhaust gas purifying device may occur.

3. A system for predicting the temperature of an exhaust gas purifying device positioned in the exhaust system of an internal combustion engine into which air and fuel are drawn to undergo combustion and from which exhaust gases are discharged into the exhaust system, the system comprising:

means for storing (A) a first schedule of predetermined values EEGT of the steady state contribution to the exhaust gas purifying device temperature due to the temperature of the exhaust gases as a function of the air flow into the engine, (B) a second schedule of predetermined values ECEXT of the steady state contribution to the exhaust gas purifying device temperature due to exothermic reactions as a function of the air/fuel ratio of the mixture drawn into the engine and (C) a third schedule of predetermined values COEF of the time response of the temperature of the exhaust gas purifying device to changes in the air flow through the engine and the air/fuel ratio of the mixture drawn into the engine as a function of the air flow drawn into the engine;

means for measuring the air flow into the engine;

means for regulating the ratio of the air and fuel drawn into the engine; and means for recurrently (A) determining the values of EEGT, ECEXT and COEF from the first, second and third schedules corresponding to the respective measured value of air flow and the regulated ratio and (B) predicting the value of the temperature of the exhaust gas purifying device in accord with the expression $$ECT_N = ECT_{N-1} + COEF(EEGT + ECEXT - ECT_{N-1})$$

where $ECT_N$ is the predicted temperature of the exhaust gas purifying device and $ECT_{N-1}$ is the previously predicted temperature of the exhaust gas purifying device.

* * * * *